UNITED STATES PATENT OFFICE.

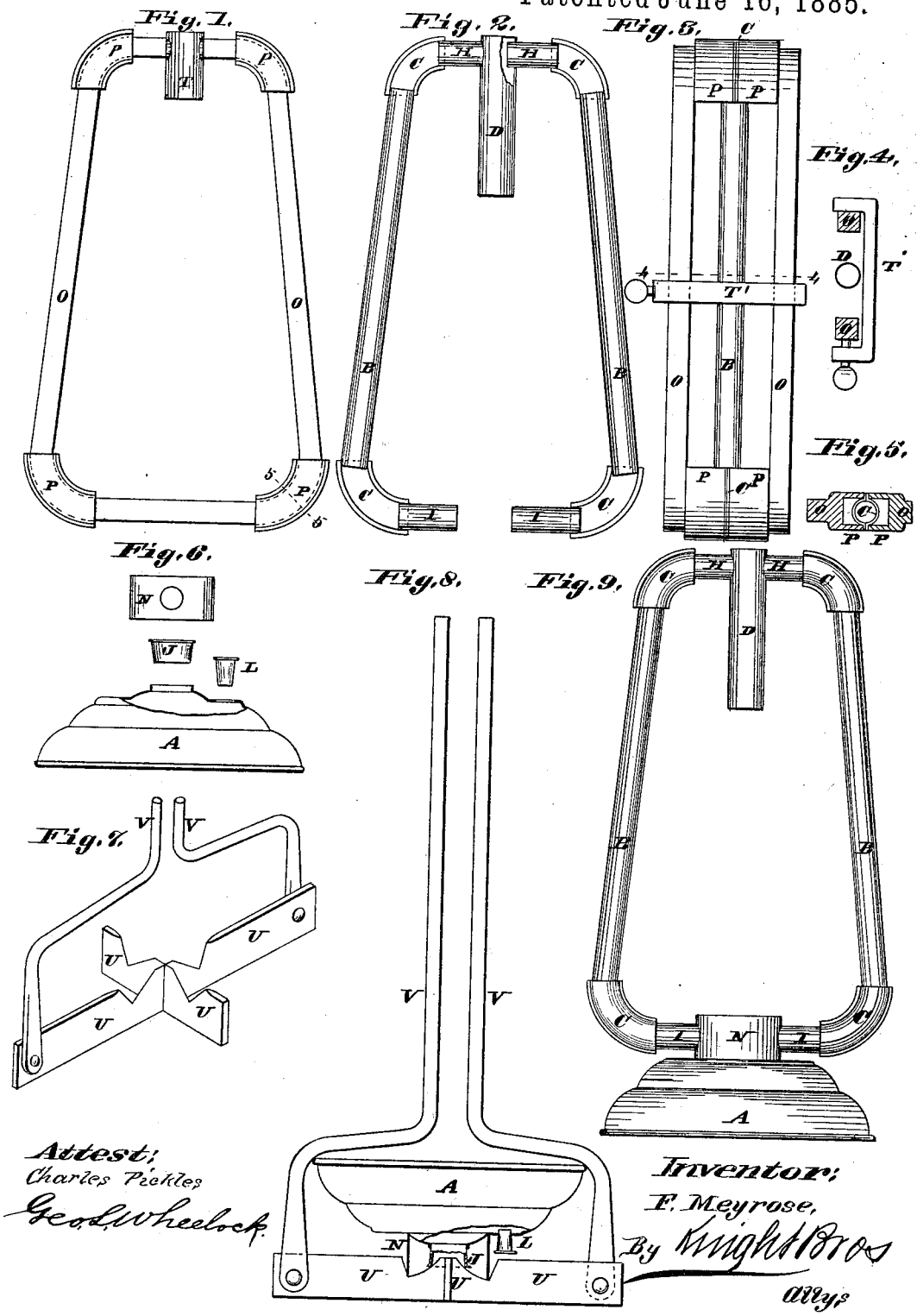

FERDINAND MEYROSE, OF ST. LOUIS, MISSOURI.

PROCESS OF MANUFACTURING TUBE-LANTERNS.

SPECIFICATION forming part of Letters Patent No. 320,381, dated June 16, 1885.

Application filed January 12, 1885. (No model.)

*To all whom it may concern:*

Be it known that I, FERDINAND MEYROSE, of the city of St. Louis, in the State of Missouri, have invented a certain new and useful Improvement in the Process of Manufacturing Tube-Lanterns, of which the following is a full, clear, and exact description, reference being had to the accompanying drawings, forming part of this specification, and in which—

Figure 1 is an inside view of one of the forms for holding the air-tubes of a lantern in place or position while being dipped. Fig. 2 is a view of a number of the parts of the tubes placed together, and Fig. 3 shows them secured in the forms. Fig. 4 is a transverse section taken on line 4 4, Fig. 3. Fig. 5 is a section through one side of both forms, taken on line 5 5, Fig. 1. Fig. 6 is a view of the fount and the parts belonging thereto. Fig. 7 is a perspective view of the tongs for holding the fount parts in place or position while being dipped. Fig. 8 is a view of the tongs and fount in position. Fig. 9 is a view of the finished article.

My invention relates to a process for manufacturing tube-lanterns; and it consists in features of novelty hereinafter fully described, and pointed out in the claim.

Referring to the drawings, A represents the fount; B, the side air-tubes; C, the corner pieces of the tubes; D, the central air-tube; H, the short horizontal tubes connecting the side tubes with the vertical tube; I, the short tubes connecting the side tubes with the ring on the fount; J, the collar secured in the top of the fount to receive the burner; L, the collar secured in the filling-hole of the fount, and N the ring over which the cone (not shown) fits.

Heretofore it has been the practice to solder these various parts in position; but I arrange them in forms and dip them into a solution (molten tin or solder) that seals the seams, holding them together. The tubes, and their connecting parts are placed together, as shown in Fig. 2, (only one-half of the corner pieces being shown,) and are placed between two forms, O, (with semicircular flanged corner pieces, P, to receive the corner pieces, C, of the lantern, and flanged pieces T to receive the central tube, D,) which are secured together by a clamp, T'. The whole is then dipped into a solution that thoroughly unites or seals the seams, holding the parts together without the use of solder.

The collars and ring above mentioned are put in position on the fount and are placed in tongs, consisting of cross-bars U and bent handles V, the bars having notches to receive the burner-collar and ring, as shown in Fig. 8, and the bends of the handles fitting the bottom of the fount, so that the parts are held in position while being dipped in the solution, which secures them together, also, without the use of solder.

My invention has several advantages, among which are: first, cheapness in producing the lantern, both in the saving of solder and the great amount of time and labor it takes to solder all the parts together; secondly, the seams are more thoroughly and uniformly sealed or united; thirdly, the appearance of the lantern is greatly improved, there being no roughness, as there necessarily is (more or less) where the parts are soldered together.

I am aware that pieces of metal have been secured together by means of lips and dipped in a solution to seal the seams, and make no claim to the same; but What I do claim, and desire to secure by Letters Patent, is—

The process herein described of manufacturing tube-lanterns, which consists in placing the air-tubes between forms in which they are clamped, dipping them as thus held in a solution to seal the seams, placing the ring and collars in position on the fount, placing the fount with its ring and collars in tongs, dipping the fount in a solution to seal the seams, and finally securing the air-tubes to the fount-ring, substantially as set forth.

FERDINAND MEYROSE.

In presence of—
 GEO. H. KNIGHT,
 SAML. KNIGHT.